Patented Apr. 30, 1935

1,999,709

UNITED STATES PATENT OFFICE 1,999,709

PURIFICATION OF BRINES

George N. Terziev, Solvay, N. Y., assignor to The Solvay Process Company, Syracuse, N. Y., a corporation of New York No Drawing. Application August 3, 1931, Serial No. 554,956

6 Claims. (Cl. 23—45)

This invention relates to the purification of liquors and in particular a process for the removal of calcium sulfate from brine containing the same, such as waste liquor from the ammonia-soda process.

In the recovery of salts from natural or artificial brines, it is customary to employ various steps of concentrating such liquors with the object of obtaining by precipitation or in other known manner, the valuable salts contained therein. When, as is often the case, such brines or liquors contain calcium sulfate, it is found that during the step of concentrating deposits of calcium sulfate frequently occur on the heating surfaces which seriously interfere with the rate of heat interchange and overall efficiency of the operation. For such operations it is, therefore, desirable to remove a portion or substantially all of the calcium sulfate prior to the step of evaporation.

For this purpose it has been proposed to add barium chloride to the brine prior to the evaporation thereof, the precipitate of barium sulfate being separated from the brine in a known manner. This method of removing calcium sulfate from brine is attended, however, with certain disadvantages, chief among which is the fact that the use of the precipitating agent, barium chloride, is expensive and hence the production cost of the salts which are subsequently recovered from the brine, are substantially increased. It has now been found that brines containing calcium sulfate, may be purified prior to treatment for the recovery of valuable salts contained therein by a process which requires relatively inexpensive reagents, hence effecting a decrease in the production cost of the valuable salts which may be recovered from the brine.

It is an object of the present invention to remove scale forming salts, such as calcium sulfate, from brines containing the same.

Another object of this invention is to provide a process for the purification of brine by means of the use of relatively inexpensive reagents and to effect the production of a brine, suitable for the recovery of valuable salts contained therein, at a low cost.

It is a further object of this invention to provide a method for the removal of scale forming salts, such as calcium sulfate, from brine which is flexible in operation and which thus provides for the removal of such scale forming salts to substantially any extent required by the art.

It has now been found that calcium sulfate may be more or less substantially completely removed from brine containing the same by producing in the brine a precipitate which comprises a salt of calcium. It has been found that if an insoluble salt of calcium, such as calcium carbonate, be produced in brine, that simultaneously with the precipitation of such calcium salt, calcium sulfate will be removed from the brine. It has been found that the co-precipitation of calcium sulfate with other salts of calcium, may be effected in solutions which are either saturated or unsaturated with respect to calcium sulfate. Further, it has been found that by producing a sufficient quantity of such precipitate comprising a calcium salt, that the simultaneous removal of the calcium sulfate from brine may be carried out to such an extent that the brine is made substantially completely free of calcium sulfate.

My invention accordingly comprises a process for the removal of calcium sulfate from brine containing the same comprising producing in said brine a precipitate of a calcium salt other than calcium sulfate. My invention further comprises a process of removing calcium sulfate from brine containing the same by adding to said brine or producing therein a substance comprising an acid radical which radical is capable of forming with calcium an insoluble compound thereof other than calcium sulfate. My invention further comprises treating brines containing calcium sulfate and other calcium salts with reagents which may comprise soluble carbonates or soluble phosphates, which substances may be produced in situ, or which may be added to the brine in solid or liquid form. My invention also comprises a process of removing calcium sulfate from brine containing the same, which consists in adding to the brine calcium hydroxide, preferably as milk of lime, and carbon dioxide, thereafter freeing the treated brine of suspended matter. I may also treat brine with unslaked lime (CaO) or slaked lime (Ca(OH)$_2$) and carbon dioxide to produce therein a precipitate of calcium carbonate.

My invention further comprises the several steps and the relation of one or more of such steps with respect to each of the others and possessing the features which are exemplified in the following detailed disclosure and the scope of the invention will be indicated in the claims.

*Example I.*—Waste liquor from the ammonia-soda process containing in solution calcium sulfate, for example 1 to 1.2 grams per liter, and much greater quantities of sodium chloride and calcium chloride, and holding therein a considerable quantity of suspended matter including calcium sulfate, is settled and to the clear liquor there is added calcium hydroxide preferably in the form of milk of lime, in an amount sufficient to give an active calcium oxide content of approximately 10 grams per liter. The "limed" brine is then continuously passed through two or more carbonators in series and in each carbonator treated with a carbon dioxide gas such as a 40 per cent lime kiln gas. The liquor in all the carbonators except the last is preferably maintained distinctly alkaline in reaction in order to promote the efficient absorption of carbon dioxide. The liquor and gas flow to the last carbonator are so regulated that the solution is slightly acid when it leaves the last carbonator. As a result of carbonation a precipitate of calcium carbonate is obtained which, it has been found, carries with it substantially all of the calcium sulfate contained in the brine. After carbonation the acid liquor may be neutralized by the addition of an alkali, such as by the addition of fresh calcium hydroxide preferably in the form of milk of lime. Finally the treated liquor is subjected to settling in a suitable apparatus and the clear liquor decanted for use in the recovery of valuable salts contained therein, e. g. calcium chloride.

In the above example the precipitate of calcium carbonate is substantially eighteen times the calcium sulfate removed. In order to obtain a reasonably satisfactory removal of calcium sulfate, the precipitate of calcium carbonate or other insoluble salt of calcium should be not less than about ten times the weight of calcium sulfate removed.

The clear liquor resulting from the above process contains about 0.25 grams per liter of calcium sulfate. The concentration of calcium sulfate in the treated brine may be reduced still further by increasing the amount of milk of lime, i. e. increasing the calcium carbonate precipitate, but for most subsequent recovery processes a more complete separation is not necessary. In accordance with my preferred procedure a precipitate of at least about 18 parts of calcium carbonate for each part of calcium sulfate removed is effected.

When carbon dioxide is added to limed brine in continuous flow, it is preferable to employ two or more carbonators in series in order to prevent by-passing incompletely treated brine. However, when brine is treated in a batch operation or to intermittent precipitation, a single carbonator may be used.

In the above example the preliminary settling operation to remove suspended matter may be omitted, but it has been found that a more complete removal of calcium sulfate is achieved if suspended matter be removed prior to treatment with lime and carbon dioxide. This is particularly true when the suspended matter comprises substantial quantites of calcum sulfate, for it has been found that the presence of suspended calcium sulfate in the brine may act deleteriously on the removal of the dissolved calcium sulfate by the freshly precipitated salt of calcium.

*Example II.*—A sodium chloride brine such as may be obtained from salt wells and containing 4.3 grams per liter calcium sulfate is treated with 10 per cent by volume milk of lime containing about 285 grams per liter of calcium oxide, and then carbonated and allowed to settle as in Example I. About 60 per cent of the original calcium sulfate content of the brine is removed with the precipitate of calcium carbonate which settles out.

*Example III.*—Waste liquor from the ammonia-soda process, such as the liquor of Example I, is treated with sodium carbonate, sodium bicarbonate or sodium phosphate in amount from 7 to 8 grams per liter. The precipitate of calcium carbonate or phosphate is allowed to settle out. The clear liquor will be found to contain only about 0.65 grams per liter of dissolved calcium sulfate, the remainder of the calcium sulfate having been removed from the solution by the precipitate of calcium carbonate or phosphate produced in the brine.

Since certain changes in carrying out the above process and certain modifications in the composition of the materials employed therein may be made without departing from the scope of the invention, it is intended that all matter contained in the above description shall be interpreted as illustrative and not in a limiting sense.

In the appended claims the term "lime" is intended to include both unslaked lime, i. e. calcium oxide, and slaked lime, i. e. calcium hydroxide.

I claim:

1. The process for removing calcium sulfate from brine containing the same, which comprises producing in said brine a precipitate of an insoluble inorganic calcium salt other than calcium sulfate equal in weight to at least ten times the weight of the calcium sulfate present, by reaction of calcium present in a form other than calcium sulfate so that the calcium sulfate present is co-precipitated from the brine together with said other calcium salt.

2. The process for removing calcium sulfate from brine containing the same, which comprises producing in said brine a quantity of a precipitate of an insoluble calcium salt of the group consisting of calcium carbonate and calcium phosphate equal in weight to at least ten times the weight of the calcium sulfate present, by reaction of calcium present in a form other than calcium sulfate so that the calcium sulfate is co-precipitated from the brine together with said other calcium salt.

3. The process for extracting calcium sulfate present in the calcium chloride brine resulting from the recovery of ammonia in the ammonia-soda process, which comprises producing in said brine a precipitate of calcium carbonate equal in weight to at least ten times the weight of the calcium sulfate present, by reaction of calcium present in a form other than calcium sulfate so that the calcium sulfate is co-precipitated from the brine together with said calcium carbonate.

4. The process for removing calcium sulfate from brine containing the same, which comprises introducing into said brine calcium hydroxide so that said calcium hydroxide is present in said brine in quantity sufficient to form a calcium carbonate precipitate equal in weight to at least ten times the weight of calcium sulfate present, and while said calcium hydroxide is present, introducing into said brine carbon dioxide to convert the calcium hydroxide to calcium carbonate and thus form a calcium carbonate precipitate equal in weight to at least ten times the weight of the calcium sulfate present so that the calcium sulfate is coprecipitated from the brine together with said calcium carbonate.

5. The process for extracting calcium sulfate present in the calcium chloride brine resulting from the recovery of ammonia in the ammonia-soda process, which comprises introducing into said brine sufficient calcium hydroxide so that said calcium hydroxide present in said brine, on carbonation, will yield a quantity of calcium carbonate at least ten times the quantity of calcium sulfate present in said brine, and while said excess of calcium hydroxide is present, introducing into said brine carbon dioxide sufficient to convert the calcium hydroxide to calcium carbonate and render the brine slightly acid in reaction whereby a calcium carbonate precipitate is formed that carries with it from the brine the calcium sulfate contained therein, and thereafter separating the precipitate from said brine.

6. The process for extracting calcium sulfate present in the calcium chloride brine resulting from the recovery of ammonia in the ammonia-soda process, which comprises freeing said brine from suspended matter, thereafter introducing into said brine sufficient calcium hydroxide so that said calcium hydroxide present in said brine, upon carbonation will form a quantity of calcium carbonate at least ten times the quantity of calcium sulfate present in said brine, flowing the brine, while said excess of calcium hydroxide is present, through two carbonators in series and subjecting the brine in each of said carbonators to treatment with carbon dioxide in such amount that the calcium hydroxide is converted to calcium carbonate and the brine is maintained alkaline in the first carbonator and is rendered slightly acid in the second carbonator whereby a calcium carbonate precipitate is formed that carries with it from the brine the calcium sulfate contained therein, and separating the precipitate from said brine.

GEORGE N. TERZIEV.